United States Patent

[11] 3,547,008

[72] Inventor Mark J. Connor
 Wilmington, Del.
[21] Appl. No. 734,470
[22] Filed June 4, 1968
[45] Patented Dec. 15, 1970
[73] Assignee Gulf and Western Industrial Products Company
 Grand Rapids, Mich.
 a corporation of Delaware, by mesne assignments

[54] CONTOUR PISTON AND CYLINDER ASSEMBLY FOR SPOT TYPE BRAKES AND CLUTCHES
 4 Claims, 3 Drawing Figs.
[52] U.S. Cl. .................................... 92/170, 92/248, 92/249
[51] Int. Cl. ..................................... F16j 11/04
[50] Field of Search ......................... 92/170, 171, 248, 249, 240, 177

[56] References Cited
UNITED STATES PATENTS

| | | | |
|---|---|---|---|
| 2,983,256 | 5/1961 | Seeloff | 92/177X |
| 3,180,236 | 4/1965 | Beckett | 92/177X |
| 1,621,858 | 3/1927 | Sherwood | 92/170 |
| 2,132,978 | 8/1938 | Stewart | 92/170 |
| 2,586,537 | 2/1952 | Hapman | 92/170 |
| 2,731,312 | 1/1956 | Du Bois | 92/170 |
| 2,884,291 | 4/1959 | Whitten | 92/240X |
| 2,886,034 | 5/1959 | Robinson et al. | 92/249X |
| 2,888,879 | 6/1959 | Gaarder | 92/170X |
| 2,962,330 | 11/1960 | Kohl | 297/205X |
| 3,040,712 | 6/1962 | Harrah | 92/170 |
| 3,052,194 | 9/1962 | Gilmore | 92/249X |
| 3,125,004 | 3/1964 | White | 92/170X |
| 3,185,042 | 5/1965 | Hastings | 92/171X |
| 3,232,186 | 2/1966 | Garrett et al. | 92/249X |
| 3,266,385 | 8/1966 | Scaramucci | 92/240X |
| 3,272,079 | 9/1966 | Bent | 92/240X |
| 3,334,549 | 8/1967 | Sheldon | 92/248 |
| 3,388,638 | 6/1968 | Brinkel | 297/205X |

Primary Examiner—Martin P. Schwadron
Assistant Examiner—Leslie J. Payne
Attorney—Meyer, Tilberry and Body ABSTRACT: A fluid actuator in which a noncircular piston having an integral seal is received in a correspondingly shaped cylinder bore. The bore has a bonded sleeve which cooperates with the seal.

PATENTED DEC 15 1970   3,547,008
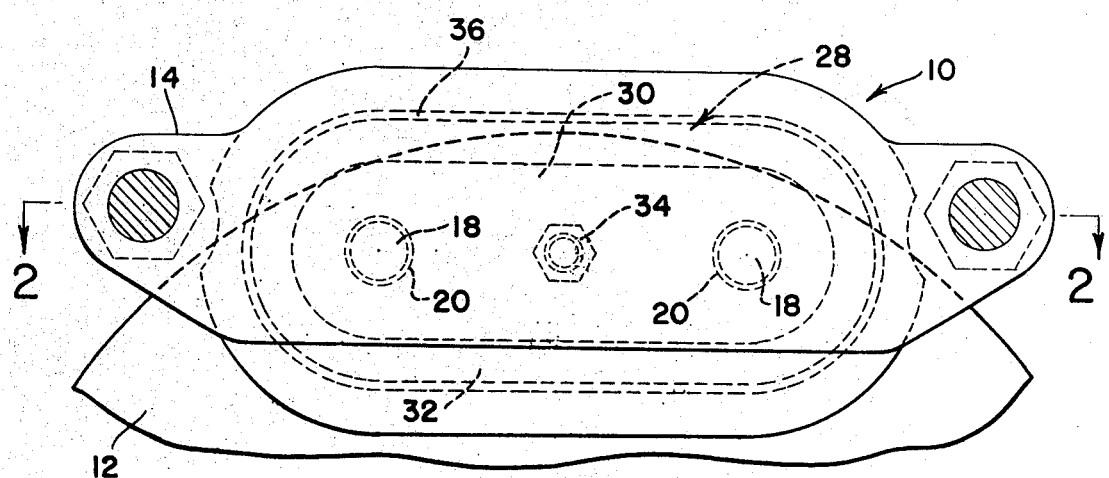
FIG. 1
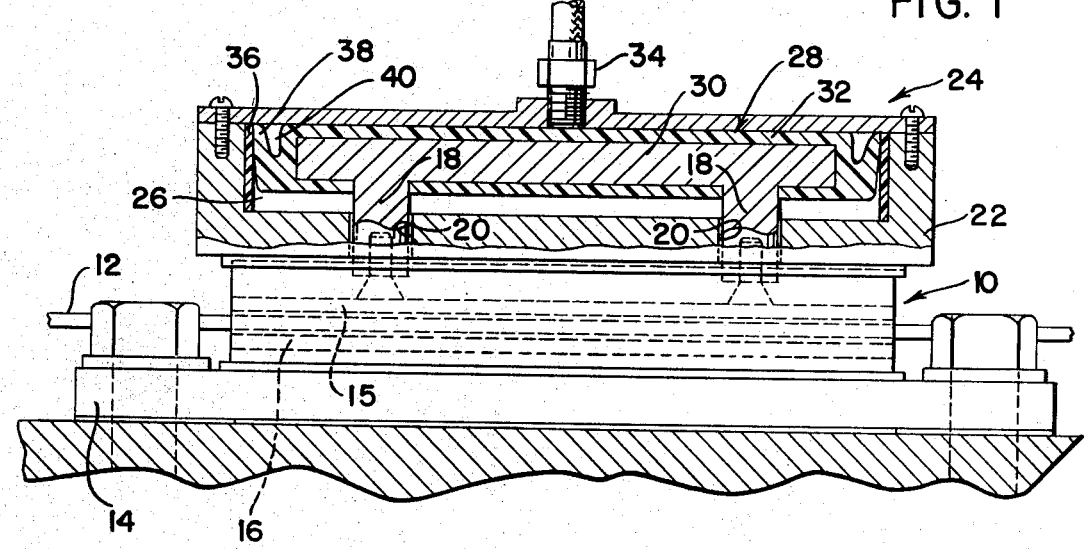
FIG. 2
FIG. 3
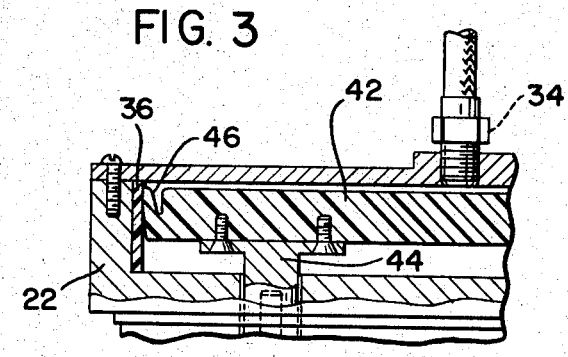
INVENTOR.
MARK J. CONNOR
BY
Meyer, Tilberry & Body
ATTORNEYS 3,547,008

CONTOUR PISTON AND CYLINDER ASSEMBLY FOR SPOT TYPE BRAKES AND CLUTCHES

This invention relates generally to the art of hydraulic actuators and, more particularly, to an improved hydraulic actuator for spot type disc brakes and clutches.

Spot type disc brakes and clutches have become well known in the art. This type of device normally employs a rotatable disc with a housing supporting arcuate friction pads on opposite sides of the disc. A suitable hydraulic operator is carried by the housing and is adapted to clamp the friction pads against a portion of the periphery of the disc. The particular hydraulic actuator normally employed comprises a conventional cylinder and a piston with the piston operatively connected to one of the friction pads thereby to displace that friction pad against the surface of the disc. Through appropriate means, such as movement of the housing, the other friction pad is caused to engage the opposite side of the disc whereby the disc is clamped between the two pads. As is well understood in the art, the force with which the friction pads clamp the disc is dependent on the level of hydraulic pressure introduced to the cylinder and the area of the piston against which the hydraulic pressure is exerted.

It is not uncommon in the use of spot type disc brakes of the described type to employ a pair of hydraulic operators thereby to increase the clamping force of the friction pads. Obviously, such an arrangement increases the number of component parts in each operator and also requires multiple fluid connections to accommodate the fluid introduced to the pair of hydraulic cylinders.

Certain problems have been experienced with hydraulic actuators of this type. For example, the use of two separate hydraulic cylinders unduly multiplies the number of fluid connections that must be provided and increases possibility of fluid leakage. In addition, the size of the hydraulic cylinders is necessarily limited due to the limited space available. Moreover, the cylindrical shape of the bore in which the piston is received requires that machined surface finish be provided to obtain the necessary sealing characteristics to prevent fluid leakage past the piston. In air actuated pistons, lubrication of the slidable piston must also be provided.

It is the primary object of this invention to provide a hydraulic actuator which overcomes each of the above-mentioned problems.

It is a further object of this invention to provide a hydraulic actuator which requires no machined finish for the cylinder bore.

It is another object of this invention to provide a hydraulic actuator in which lubrication for the slidable piston is unnecessary.

It is a further object of this invention to provide a hydraulic actuator in which the piston may be noncircular in configuration and in which the effective area of the piston may be selected to meet the requirements of the particular installation.

Still another object of this invention is to provide a hydraulic actuator in which good sealing characteristics of the piston in the bore are obtained without the necessity of special machining operations.

More specifically, this invention contemplates a hydraulic actuator in which the piston may be noncircular in configuration and in which the cylinder bore is of a corresponding noncircular configuration. A nonmetallic liner is secured to the rough cast walls of the bore and the piston carries nonmetallic sealing means which are in sliding and sealing engagement with the liner.

It is contemplated that the seal carried by the piston may be formed integral with the piston. The piston may either be a solid molded plastic material or a steel member embedded in a molded plastic material. In either instance, a substantially V-shaped sealing lip is formed integrally with and extends around the periphery of the piston with the lip being in sliding and sealing engagement with the nonmetallic liner.

Other features and objects of this invention will become more apparent upon a complete reading of the following description which, together with the attached drawings, described but a preferred embodiment of the invention.

Referring now to the drawings wherein like reference numerals indicate like parts in the various views:

FIG. 1 is a fragmentary side elevation view of a spot type disc brake incorporating the principles of this invention, FIG. 2 is a sectional view along line 2–2 of FIG. 1, FIG. 3 is a fragmentary sectional view showing a modified construction of the piston assembly.

Referring now to FIG. 1, wherein the showing is for purposes of illustrating a preferred embodiment only, there is illustrated a spot type or caliper type clutch or brake assembly indicated generally by the reference numeral 10. This assembly 10 is supported by appropriate means, now shown, adjacent to a portion of the periphery of a rotatable disc 12.

As illustrated more in detail in FIG. 2, the assembly comprises a housing 14 supporting a pair of friction pads 15, 16 disposed on opposite sides of the disc 12. The friction pad 16 is secured to the housing 14. The friction pad 15 is supported for movement by appropriate means, not shown, and is connected to a pair of projections 18 which comprise piston rods. The piston rods projects through openings 20 in a cylinder housing 22 of a hydraulic actuator indicated generally by reference numeral 24.

The cylinder housing, as shown in FIG. 1, is substantially oval-shaped in configuration. As will become more apparent hereinafter, the housing may be of almost any configuration. The housing includes an inner chamber or bore 26 which also may be oval-shaped in configuration. It will also be understood that this chamber 26 may take other forms as well with the oval-shape being merely exemplary of one noncircular shape or configuration which may be employed. Disposed in the chamber 26 is a piston 28, which has a configuration generally corresponding to the shape of the bore or chamber 26. Thus, the piston comprises an oval-shaped steel core 30 with the piston rods 18 being formed integrally therewith. It is to be understood that the piston rods may be separate from the core 30 so long as there is some form of operable interconnection between the core 30 and the rods 18.

Molded over the core 30 is a nonmetallic plastic material 32 which preferably covers the core with the exception of the area where the piston covers rods 18 join the core. As will be readily understood, the piston 28 is adapted to reciprocate in the chamber 26 with appropriate fluid connections 34 providing means for the introduction of fluid pressure into the chamber 26 on one side of the piston thereby to displace the piston toward the disc 12.

The fluid chamber 26 further includes a circumferentially continuous sleeve 36 which is bonded or otherwise secured to the walls of the chamber. The sleeve 36 of a nonmetallic material which normally would be the same as the material 32 forming the piston 28.

Cooperating with this sleeve to provide a sealing joint is the edge configuration of the piston. This edge configuration is substantially V-shaped in cross section and includes an outwardly tapered leg 38 which is separated by a groove 40 from the body of the piston. In this manner, the lip 38 has a degree of radial flexibility which permits the piston to accommodate dimensional variations and yet achieve a seal with the sleeve 36. Moreover, the groove 40 serves the important function of exposing the leg 38 to the fluid pressure thereby to cause the leg 38 to engage the sleeves and provide a seal even at high pressures.

The liner 36 eliminates the necessity for machining the chamber in which the piston 28 is received. Thus, the cylinder housing 22 may be cast with any desired shape of the chamber 26. Thereafter, and without any further machining on the chamber in the housing 22, a mold is placed in the chamber and a phenolic filler is potted around the mold. Once the phenolic material has hardened and is bonded to the walls of the chamber 26, the mold is removed. The piston 30 may then be placed in the chamber with the molded sleeve 36 thus presenting a smooth surface against which the sealing leg 38 may engage.

Both the sleeve 36 and the molded portion of the piston may be formed from a wide variety of materials such as epoxies, thermosetting plastics or thermoplastics. The particular selection of materials depends largely on the requirement that the material have a low coefficient of friction and the capability of operating without lubrication.

Referring now to FIG. 3, there is illustrated a modified embodiment of the invention. In this embodiment, the piston is constructed from a solid piece of plastic material with the pistons rods 44 being secured to the piston 42. As in the embodiment of FIG. 2, the peripheral portion of the piston 42 includes a sealing lip 46 which is in sliding and sealing engagement with the liner 36 carried in the housing 22.

It is believed that the above-described embodiments fully achieve each of the objects heretofore set forth. Thus, the hydraulic actuator may be constructed to any desired configuration thereby to maximize the effective area of the piston for any given application. There is no need to rely only on cylindrical pistons and, with the described embodiments, but a single set of fluid connections are required. Moreover, all machining has been eliminated and, through the proper selection of materials, no supplementary lubrication is required even though the hydraulic system may be air actuated.

In addition, the construction of the described seal carried by the piston is such that the seal becomes more effective as the pressure in the chamber increases. Thus, the groove 40 exposes the leg 38 to the system pressure, which pressure acts on the leg to force the leg into sealing engagement with the sleeve. As the pressure increases, the pressure in groove 40 forcing the leg against the sleeve increases in a corresponding amount. This relationship, coupled with the low coefficient of friction inherent in the materials employed, results in a freely slidable piston with good sealing characteristics over a wide range of pressures and fluids.

Changes and modifications in the described embodiments will suggest themselves to those having ordinary skill in the art and it is intended that such changes and modifications are to be included within the scope of this invention as defined by the appended claims.

I claim:

1. In a spot type disc brake or clutch of the type having a rotatable disc, a housing supporting a pair of arcuate friction pads on opposite sides of said disc and hydraulic means operable to move said friction pads into engagement with said disc, the improvement comprising:

said hydraulic means including a housing having a noncircular fluid chamber therein;

noncircular piston means in said fluid chamber with the periphery of said piston means being spaced from the walls of said chamber, said piston means including a plurality of force producing projections;

a nonmetallic liner extending around and in engagement with the walls of said fluid chamber; and said piston means comprising a metallic core imbedded in a nonmetallic material.

2. The improvement of claim 1 wherein said liner is bonded to the walls of said fluid chamber.

3. The improvement of claim 1 wherein said sealing means is formed integrally with said piston means.

4. The improvement of claim 1 wherein said nonmetallic portion of said piston includes a flexible sealing lip extending around the periphery of said piston and in engagement with said liner.